United States Patent
Seike

(10) Patent No.: US 9,121,985 B2
(45) Date of Patent: Sep. 1, 2015

(54) ACTIVE MATRIX LIGHTING UNITS FOR A DISPLAY

(75) Inventor: Aya Seike, Tokyo (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 300 days.

(21) Appl. No.: 13/582,710

(22) PCT Filed: Mar. 8, 2012

(86) PCT No.: PCT/US2012/028284
§ 371 (c)(1),
(2), (4) Date: Sep. 4, 2012

(87) PCT Pub. No.: WO2013/133838
PCT Pub. Date: Sep. 12, 2013

(65) Prior Publication Data
US 2013/0235442 A1    Sep. 12, 2013

(51) Int. Cl.
| | | |
|---|---|---|
| G02B 26/08 | (2006.01) | |
| F21V 8/00 | (2006.01) | |
| G02B 26/02 | (2006.01) | |
| G02B 6/35 | (2006.01) | |

(52) U.S. Cl.
CPC .............. *G02B 6/0053* (2013.01); *G02B 26/02* (2013.01); *G02B 6/357* (2013.01); *G02B 6/3526* (2013.01); *G02B 6/3536* (2013.01)

(58) Field of Classification Search
CPC .... G02B 26/02; G02B 6/0053; G02B 6/3526; G02B 6/3536; G02B 6/357; G02B 26/08; G09G 3/3648; G09G 3/3677
USPC ............ 359/210.1, 222.1, 295, 298; 345/102
See application file for complete search history.

(56) References Cited

U.S. PATENT DOCUMENTS

| | | |
|---|---|---|
| 6,523,736 B1 | 2/2003 | Farnworth |
| 7,612,756 B2 | 11/2009 | Kim |
| 7,878,670 B2 | 2/2011 | Shibasaki et al. |
| 7,931,515 B2 | 4/2011 | Chari et al. |
| 2009/0174638 A1 | 7/2009 | Brown Elliott et al. |
| 2011/0001693 A1 | 1/2011 | Kim et al. |
| 2011/0007377 A1 | 1/2011 | Selbrede et al. |
| 2011/0141718 A1 | 6/2011 | Weng et al. |

FOREIGN PATENT DOCUMENTS

| | | |
|---|---|---|
| JP | 2005-176428 | 6/2005 |
| JP | 2009-109975 | 5/2009 |

OTHER PUBLICATIONS

Suzuki, N., "PC Watch last week keyword" Naomi Suzuki, Retrieved from Internet URL: https://web.archive.org/web/20060517033110/http://pc.watch.impress.co.jp/docs/article/980624/key35.htm on Nov. 10, 2014, pp. 1-4 (Jun. 15-Jun. 19, 2010).

(Continued)

*Primary Examiner* — James Phan
(74) *Attorney, Agent, or Firm* — Knobbe, Martens, Olson & Bear, LLP

(57) ABSTRACT

The present disclosure generally relates to a light manipulating device. The light manipulating device can include a light guide and an actuator above the light guide with at least one lens connected to the actuator. The at least one lens and the light guide can have a substantially similar refractive index.

21 Claims, 8 Drawing Sheets

(56) References Cited

OTHER PUBLICATIONS http://www.aist.go.jp/aist_j/aistinfo/aist_today/vol11_02/special2/p14.html; Information was available at website: http://www.aist.go.jp/aist_j/aistinfo/aist_today/vol11_02/special2/p14.html, in some form no later than Oct. 17, 2011.

http://www4.fed.or.jp/tansaku/yuki/02_chiba.pdf; Information was available at website: http://www4.fed.or.jp/tansaku/yuki/02_chiba.pdf, in some form no later than Oct. 17, 2011.

http://www.threebond.co.jp/ja/technical/technicalnews/pdf/tech44.pdf, ThreeBond Co., Ltd., ThreeBond Technical News, Jan. 1, 1995, vol. 44.

Backlight from Wikipedia; http://en.wikipedia.org/wiki/Backlight; Information was available at website: http://en.wikipedia.org/wiki/Backlight, in some form no later than Oct. 17, 2011.

EPAM (Electroactive Polymer Artificial Muscle), "Present and future of the SRI artificial muscle actuator (EPAM)," Information was available at website: http://207.46.192.232/proxy.ashx?a=http%3A%2F%2Fb.hatena.ne.jp%2Fentry%2Fwwwr.f . . . , in some form no later than Oct. 17, 2011.

International Search Report and Written Opinion received in International Application No. PCT/US2012/028284, mailed on Jun. 1, 2012, filed on Mar. 8, 2012.

http://www4.fed.or.jp/tansaku/yuki/02_chiba.pdf, Information was available at website: http://www4.fed.or.jp/tansaku/yuki/02_chiba.pdf, in some form no later than Oct. 17, 2011.

Liquid Crystal Display from Wikipedia; http://en.wikipedia.org/wiki/Liquid_crystal_display; Information was available at website: http://en.wikipedia.org/wiki/Liquid_crystal_display, in some form no later than Oct. 17, 2011.

Mohanty et al., "Effect of Squeegee Blade on Solder Paste Print Quality," Speedline Technologies, Jun. 17, 2010, Franklin, MA.

Pelrine et al., "High-Speed Electrically Actuated Elastomers with Strain Greater Than 100%," Science, Feb. 4, 2000, pp. 836-839, vol. 287.

ACTIVE MATRIX LIGHTING UNITS FOR A DISPLAY

CROSS-REFERENCE TO RELATED APPLICATIONS

This application is the U.S. National Phase entry under 35 U.S.C. §371 of International Application No. PCT/US2012/028284, filed Mar. 8, 2012. The contents of the Application are hereby incorporated by reference in its entirety.

TECHNICAL FIELD

Embodiments herein generally relate to lighting systems.

BACKGROUND

Display devices using a backlight to illuminate the display traditionally suffer from a reduced contrast ratio due to leakage of light from the backlight. In addition, arranging LEDs in a matrix to improve contrast ratio increases power consumption, increases costs, and increases the temperature of the backlight that adds to the need for controlling heat dissipation.

SUMMARY

Some embodiments provided herein relate to a light manipulating device. In some embodiments, the light manipulating device can include a light guide and an actuator above the light guide. The actuator can include a bottom electrode, an actuatable layer, and a top electrode above the bottom electrode. The light manipulating device can further include at least one lens connected to the actuatable layer. The at least one lens and the light guide can have a substantially similar refractive index.

In some embodiments, a method of operating a light manipulating device is provided. The method can include providing a light manipulating device including a light guide and an actuator above the light guide. The actuator can include a bottom electrode, a top electrode, and an actuatable layer between the bottom electrode and the top electrode. The light manipulating device can further include at least one lens connected to the actuatable layer. The at least one lens and the light guide can have a substantially similar refractive index. The method can further include contacting the at least one lens with the light guide by bending the actuator. The method can also include providing light to the light guide. The method can further include passing light in the light guide through the at least one lens, when the at least one lens is contacting the light guide, thereby operating the light manipulating device.

In some embodiments, a method of manufacturing a light manipulating device is provided. The method can include forming at least a first electrode on a top surface of a first flexible thin film. The method can further include forming at least a second electrode on a bottom surface of the first flexible film. The method can further include forming at least one hole through the first flexible thin film. The method can further include providing at least one lens in the at least one hole.

In some embodiments, a light emitting display is provided herein. The light emitting display can include a light guide and an actuator above the light guide. The actuator can include a bottom electrode, a top electrode, and an actuatable layer between the bottom electrode and the top electrode. The light emitting display can further include an array of spherical lenses within the actuatable layer. The at least one lens of the array of spherical lenses can have a refractive index adequately similar to a refractive index of the light guide so as to allow optical transmission when at least one lens of the array of spherical lenses touches the light guide.

The foregoing is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
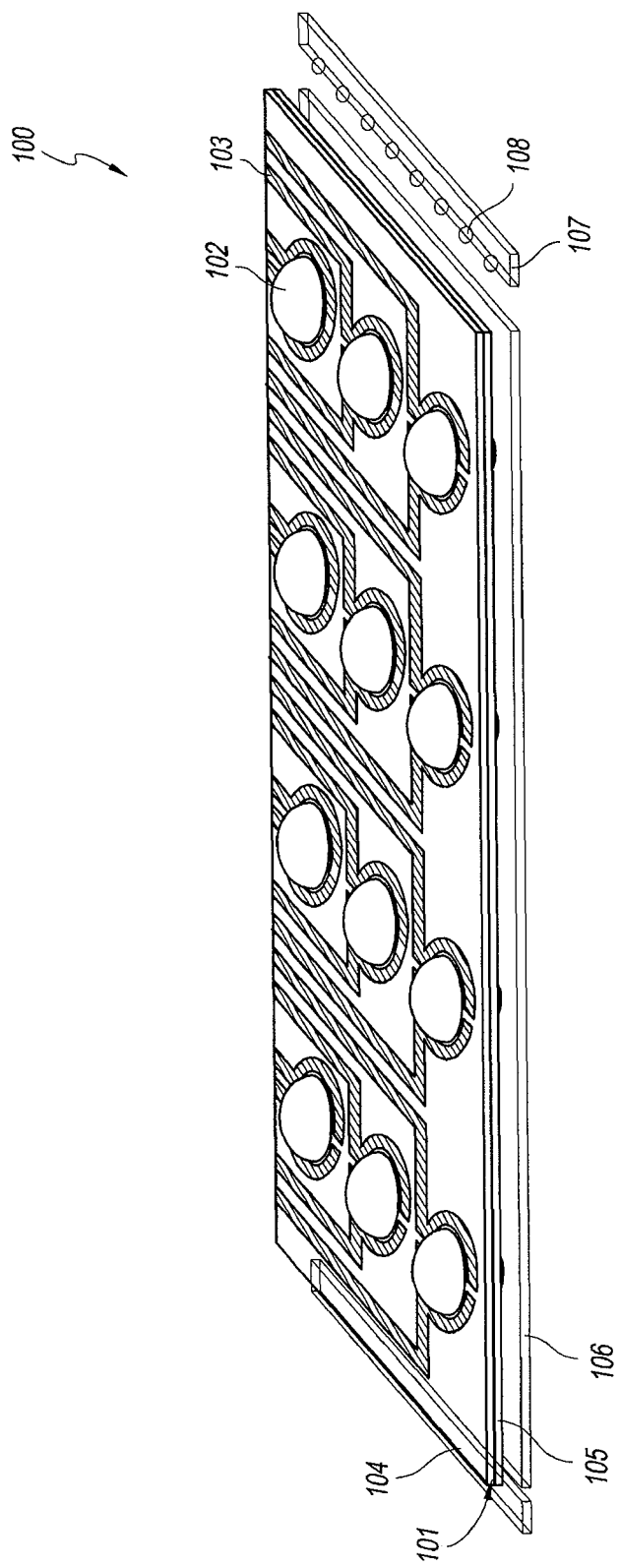
FIG. 1 is a drawing depicting a perspective view of a light manipulating device in accordance with some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some embodiments, the methods and apparatuses disclosed herein generally relate to a light manipulating device. In some embodiments, the light manipulating device can include a light guide and an actuator above the light guide with at least one lens connected to the actuator. The at least one lens and the light guide can have a substantially similar refractive index. In some embodiments, the actuator can be a gel actuator. In some embodiments, the at least one lens can be approximately spherical. In some embodiments, contact of the lens to the light guide can allow transmission of light in the light guide to pass through the lens. In some embodiments, this allows for the general provision of light along an area by the light guide, while allowing focused and/or specific release of that light, by the lens, as desired.

FIG. 1 is a drawing depicting a perspective view of a light manipulating device 100 in accordance with some embodiments. In some embodiments, the light manipulating device 100 can include a light guide 106. In some embodiments, the light manipulating device 100 can include one or more lenses 102. In some embodiments, one or more of the lenses 102 can be approximately spherical. As illustrated in FIG. 1 (and FIG. 2), the lenses 102 can be arranged in an array across an actuator 101. In some embodiments, the lenses 102 can be connected to the actuator 101. In some embodiments, the actuator 101 can be above the light guide 106. The actuator 101 can include a bottom electrode 105, an actuatable layer 104, and a top electrode 103 above the bottom electrode 105. In some embodiments, the actuatable layer 104 can include a gel. In some embodiments, the actuatable layer 104 can include a flexible organic thin film. In some embodiments, the organic thin film can include an electroactive polymer actuator. In some embodiments, the electroactive polymer actuator can include ion movement through an ion exchange membrane. In some embodiments, the electroactive polymer actuator can include an electroactive polymer artificial muscle. In some embodiments, the electroactive polymer actuator can include a dielectric material, a dielectric material with plasticizing agent (for example, dibutyl adipate (DBA)), a gel including ionic materials, polymer and/or carbon nanotubes. In some embodiments, the actuator 101 can be configured to bend towards the bottom electrode 105.

In some embodiments, the light manipulating device 100 can include a light source 107 configured to emit light into the light guide. In some embodiments, the light source 107 can be provided on a side wall of the light guide, although it need not be so located. Such an arrangement can allow for a single light source to provide light across the entire length of the array. In some embodiments, multiple light sources can be used, in either the x-axis and/or the y-axis of the array. In some embodiments, the light source can be a combination of light sources, such as red, green, and blue, so that combinations and/or various intensities of various colors can be transmitted through either a single lens (e.g., where the light sources drop into the same light guide, or different lens (e.g., where there are multiple light guides feeding various lens and each source goes to a separate light guide). In some embodiments, the light source is configured to provide white light or other combinations of wavelengths for backlighting, for example, by a) combining three primary colors (red: for example 700 nm, green, for example 546.1 nm, and/or blue, for example 435.8 nm), or b) phosphor-based LEDs (for example, blue spectrum 465 nm+the broadband Stokes-shifted light at around 500-700 nm).

In some embodiments, the light guide 106 can have the same refractive index as at least one of the lenses 102. In some embodiments, the light guide 106 can have a substantially similar refractive index as at least one of the lenses 102 (e.g., similar enough to allow the desired amount of different in light emission from the lens due to the different states of reflection and transmission that the lens is in with respect to the light guide). In some embodiments, the light guide 106 can guide light below the plurality of lenses 102. In some embodiments, the actuator 101 is configured to deflect towards the bottom electrode 105. In some embodiments, at least one of the lenses 102 can contact the light guide 106 when the actuator 101 is deflected towards the bottom electrode 105. In some embodiments, the lens can be made of a material that is transparent and has substantially the same or close enough index of reflection, for example, various organic glasses, for example acrylic resin, poly(methyl methacrylate) (PMMA), cycloolefin polymer, and/or polycarbonate.

In some embodiments, the top electrode 103 and the bottom electrode 105 constituting the actuator 101 can be made of plastic materials. For example, in some embodiments, at least one of the top electrode 103 and the bottom electrode 105 can include at least one carbon nanotube. In some embodiments, at least one of the top electrode 103 and the bottom electrode 105 can include a conductive polymer.

As noted above, in some embodiments, the actuatable layer 104 can be positioned between the top electrode 103 and the bottom electrode 105. In some embodiments, the actuatable layer 104 can be an organic thin film. For example, in some embodiments, the actuatable layer 104 can be an electroactive polymer actuator. In some embodiments, the electroactive polymer can be a dielectric EAP, a ferroelectric polymer, an electrostrictive graft polymer, a liquid crystalline polymer, anionic EAP, an electrorheological fluid, an ionic polymer-metal composite. The electroactive polymer actuator can actuate based on: electrostriction of a dielectric material, ion movement through an ion exchange membrane, structural change in a polymer, or an electroactive polymer artificial muscle (EPAM). In some embodiments, the actuatable layer can need not be positioned between the top and bottom electrode, but can instead be positioned above or below the top and bottom electrode, as long as deflection can still occur via the top and bottom electrodes, e.g., the pair of electrodes can deflect, and their deflection still applies a force on the actuatable layer.

In some embodiments, FIG. 1 can illustrate a light emitting display 100. The light emitting display 100 can include a light guide 106 and an actuator 101 above the light guide 106. The actuator can include a bottom electrode 105, a top electrode 103, and an actuatable layer 104 between the bottom electrode 105 and the top electrode 103. The light emitting display can further include an array of spherical lenses 102 within the actuatable layer 104. In some embodiments, at least one lens of the array of spherical lenses 102 can have a refractive index adequately similar to a refractive index of the light guide 106 so as to allow optical transmission when the at least one lens of the array of spherical lenses 102 touches the light guide 106.

In some embodiments, the light emitting display 100 can be used as a backlight unit. The array of spherical lenses 102 can enable local dimming in a display more effectively. In some embodiments, local dimming in a display can be achieved by decreasing the size (e.g., diameter) of the spherical lenses 102 or decreasing the pitch and increasing the number of spherical lenses 102.

Figure 2:
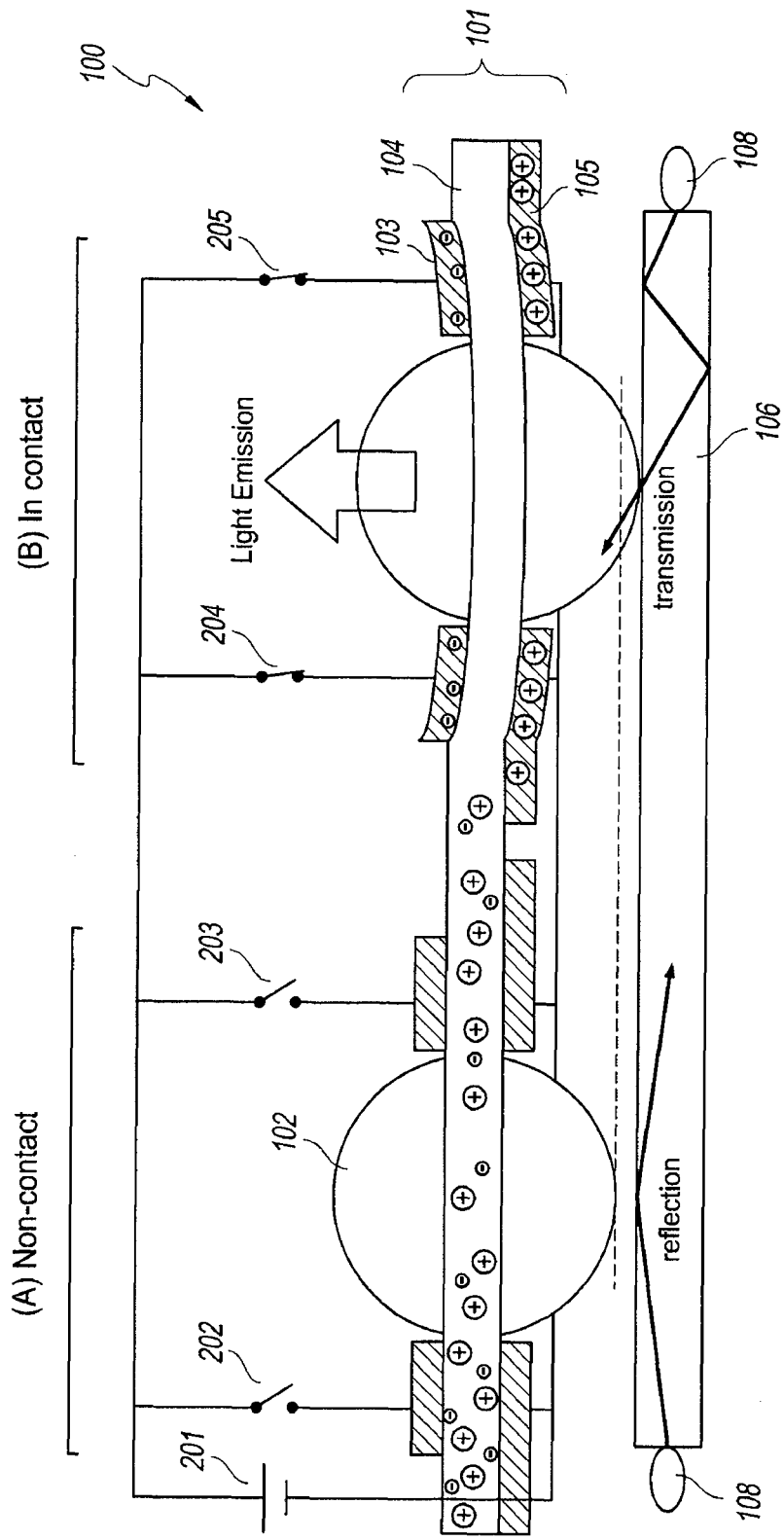
FIG. 2 is a schematic diagram of a light manipulating device in accordance with some embodiments.

FIG. 2 is a schematic diagram of a light manipulating device in accordance with some embodiments. FIG. 2 illustrates two spherical lenses 102 in a light manipulating device 100, with one of the lenses 102 in contact with a light guide 106 and another one of the lenses 102 not in contact with the light guide 106.

FIG. 2 shows some embodiments of a method of operating the light manipulating device 100. The method can include providing a light manipulating device 100. In some embodiments, the light manipulating device 100 can include a light guide 106 and an actuator 101 above the light guide 106. The actuator 101 can include a bottom electrode 105, a top electrode 103, and an actuatable layer 104 between the bottom electrode 105 and the top electrode 103. In some embodiments, the light manipulating device 100 can also include at least one lens 102 connected to the actuatable layer 104. In some embodiments, the at least one lens 102 and the light guide 106 can have a substantially similar refractive index. In some embodiments, the method can further include contacting the at least one lens 102 with the light guide 106 by bending and/or deflecting the actuator 101. In some embodiments, the method can further include providing light to the light guide 106. In some embodiments, the method can further include passing light in the light guide 106 through the at least one lens 102, when the at least one lens 102 is contacting the light guide 106, thereby operating the light manipulating device 100.

In some embodiments, the method of operating the light manipulating device 100 can include contacting the at least one lens 102 with the light guide 106 by bending the actuator 101. In some embodiments, the method can further include applying a voltage between the bottom electrode 105 and the top electrode 103 to thereby bend the actuator. In some embodiments, the bottom electrode 105 and the top electrode 103 can be in electrical communication with an electric source 201. In some embodiments, the voltage can be applied between the bottom electrode 105 and the top electrode 103 when switches 204 and 205 are closed. As illustrated in FIG. 2, when the voltage is applied, the positive ions in the actuatable layer 104 can be attracted to the bottom electrode 105 (anode) and the negative ions in the actuatable layer 104 can be attracted to the top electrode 103 (cathode). The actuatable layer 104 can be depleted so that the actuatable layer 104 can be bent towards the bottom electrode 105. In some embodiments, the method of operating the light manipulating device 100 can include forcing the actuator 101 towards the bottom electrode 105 via the applied voltage.

In some embodiments, the actuator 101 can include a polymer, and forcing the actuator 101 towards the bottom electrode 105 can include reducing a thickness of the polymer. For example, when a voltage is applied to the polymer, a positive side and a negative side of the polymer are attracted due to electrostatic forces, which can cause the polymer to be reduced (e.g., compressed) in thickness and stretched out in a planar direction.

In some embodiments, the method of operating the light manipulating device 100 can include providing light to the light guide 106. In some embodiments, one or more light sources 108 can transmit light into the light guide 106. In some embodiments, the one or more light sources 108 can be one or more light-emitting diodes (LEDs). In some embodiments, the one or more light sources 108 can be positioned on one or more sidewalls of the light guide 106.

In some embodiments, the method of operating the light manipulating device 100 can include passing light through the light guide 106 through the at least one lens 102 when the at least one lens 102 is adequately contacting the light guide 106.

In some embodiments, the at least one lens 102 can be approximately spherical or spherical. The light entering a bottom point of the spherical lens 102 can exit the lens 102 on an opposite side of the lens 102. In some embodiments, when the at least one lens 102 and the light guide 106 have the same refractive index and are in contact with each other, light is not reflected at an interface between the at least one lens 102 and the light guide 106 and the light can pass through the lens (as shown in section B of FIG. 2). In some embodiments, when the at least one lens 102 and the light guide 106 do not have effectively the same refractive index and are in contact with each other, light is refracted at the interface between the at least one lens 102 and the light guide 106. This can lead to a loss of efficiency of light extraction through the at least one lens 102. In some embodiments, the components need not have identical refractive indexes, as long as an adequate or desired amount of light is transmitted. In some embodiments, one of skill in the art could employ Fresnel's equation (eq. 1) and Snell's law (eq. 2) to determine such ranges that are acceptable, for example, as outlined below.

$$R = \frac{\left\{\frac{\sin(\alpha-\beta)}{\sin(\alpha+\beta)}\right\}^2 + \left\{\frac{\tan(\alpha-\beta)}{\tan(\alpha+\beta)}\right\}^2}{2} \quad \text{eq. 1}$$

$$\frac{\sin\alpha}{\sin\beta} = \frac{n_2}{n_1} \quad \text{eq. 2}$$

$$\sin\beta = \frac{n_1}{n_2}\sin\alpha \quad \text{eq. 2'}$$

where R is the reflection rate, α is incident angle, β is refraction angle, $n_1$ is the index of reflection of material 1 (e.g., the light guide 106), and $n_2$ is the index of reflection of material 2 (e.g., lens 102). For example, if the incident angle of the light is 30 degree, and if one uses acrylic resin, which index of reflection is 1.49, for the light guide 106, and one also uses acrylic resin for a lens 102, then reflection rate R is 0 (100% transparent). If $n_1$ is 1.49 (acrylic resin), and if one uses a material for a lens which has the index of reflection of 1.48 for $n_2$ (99% identical to $n_1$), then R is $3.49*10^{-5}$. If $n_1$ is 1.49 (acrylic resin), and if one uses a material for a lens which has the index of reflection of 1.42 for $n_2$ (95% identical to $n_1$), then R is $8.94*10^{-4}$. The values of R varied depending on the incident angle.

In some embodiments, the method of operating the light manipulating device 100 can further include removing the at least one lens 102 from contact with the light guide 106. In some embodiments, removing the at least one lens 102 can be achieved by reversing a voltage between the bottom electrode 105 and the top electrode 103. In some embodiments, removing the lens 102 can be achieved by removing or reducing a voltage between the bottom electrode 105 and the top electrode 103. In some embodiments, removing or reducing the voltage between the bottom electrode 105 and the top electrode 103 can be achieved by opening switches 202 and 203. In some embodiments, the actuatable layer 104 can contain sufficient spring force to adequately remove the at least one lens 102 from contacting the light guide 106 when the voltage is reduced or removed.

In some embodiments, the method of operating the light manipulating device 100 can further include reflecting light internally in the light guide 106 when the at least one lens 102 is released from contacting the light guide 106 (e.g., FIG. 2, section A). One or more light sources 108 can transmit light into the light guide 106 that can be incident on an interface between the light guide 106 and air. In some embodiments, light can be totally internally reflected due to the difference between the refractive indices of the light guide 106 and air, so that light does not exit the light guide 106. In some embodiments, light, even once it reaches the end of the light guide 106 can, can be redirected back down the light guide so that it can have an additional opportunity to leave the light guide via an actuated lens. Such embodiments can further increase the efficiency of the system.

Figure 3A:
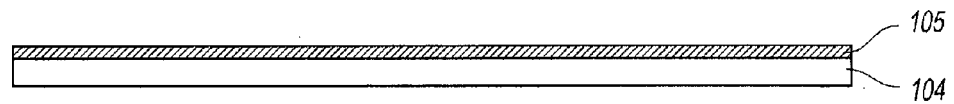
FIGS. 3A-3Q are schematic diagrams depicting how to prepare a light manipulating device in accordance with some embodiments.
Figure 3B:
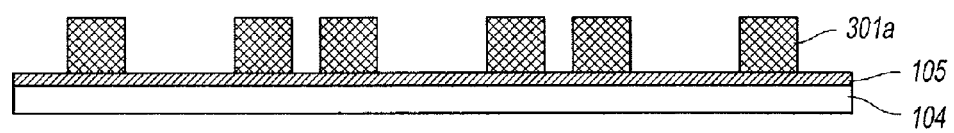
Figure 3C:
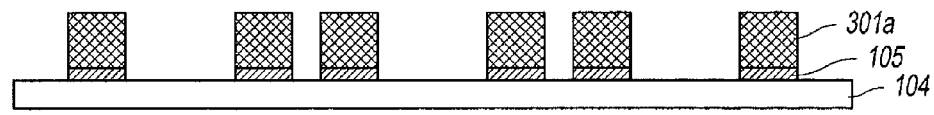
Figure 3D:
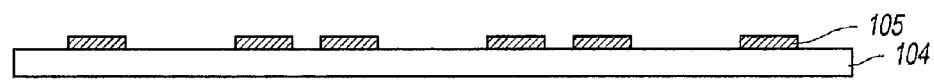

There are a variety of configurations of these arrays, and of course, a variety of ways of making such arrays. FIGS. 3A-3Q are schematic diagrams depicting how to prepare a light manipulating device in accordance with some embodiments.

As illustrated in FIG. 3A, in some embodiments, at least a first electrode 105 on a top surface of a first flexible thin film 104 is formed. In some embodiments, forming at least the first electrode 105 can include depositing a first conductive thin film on the top surface of the first flexible thin film 104. In addition, forming at least the first electrode 105 can include patterning the first conductive thin film to form the first electrode 105, as illustrated in FIG. 3B. In some embodiments, patterning the first conductive thin film can include applying a photoresist 301a on portions of the first electrode 105 where electrodes are to be formed. In some embodiments, patterning the first conductive thin film can further include etching the first conductive thin film, as illustrated in FIG. 3C. For example, etching the first conductive thin film can include dry or wet etching. In FIG. 3D, in some embodiments, patterning the first conductive thin film can further include removing the photoresist 301a.

Figure 3E:
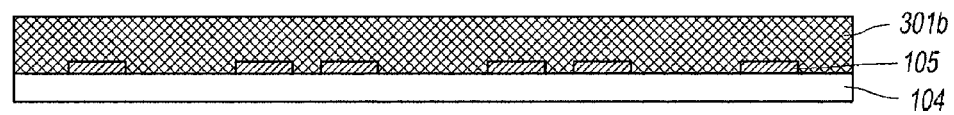
Figure 3F:
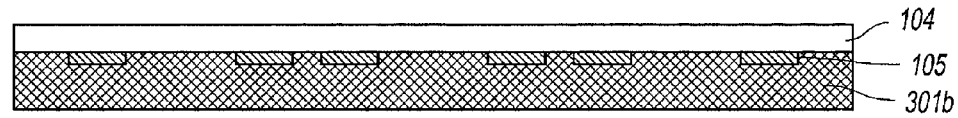

As illustrated in FIG. 3E, in some embodiments, a photoresist 301b can be applied to the top surface the first flexible thin film 104 and over the first electrode 105. In some embodiments, the method of manufacturing the light manipulating device 100 can include inverting the entirety of the first flexible thin film 104, the first electrode 105, and the photoresist 301b, as illustrated in FIG. 3F. Processing can now occur on a bottom surface of the first flexible thin film 104.

Figure 3G:
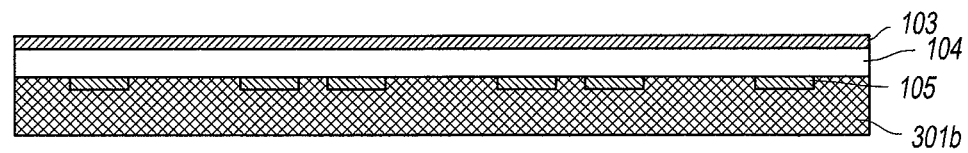
Figure 3H:
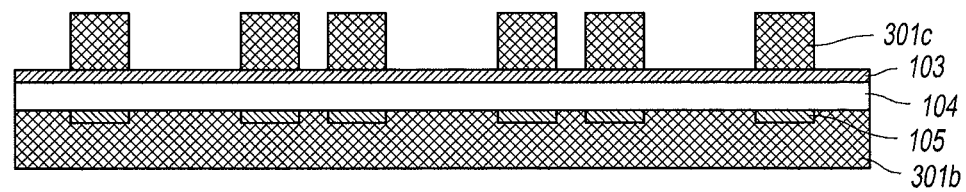
Figure 3I:
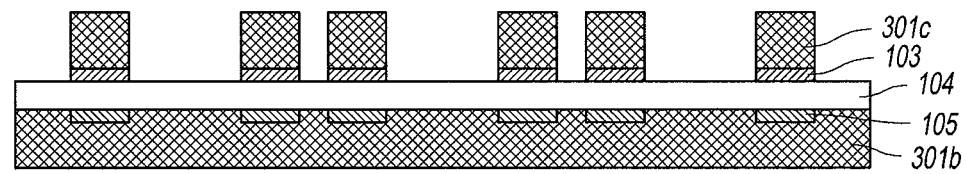
Figure 3J:
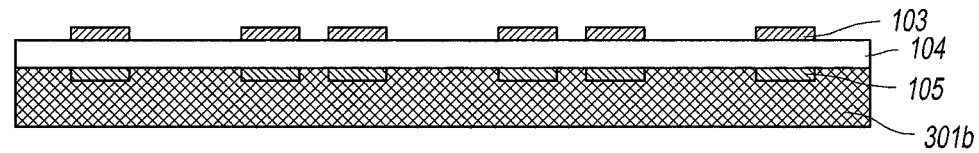

In FIG. 3G, in some embodiments, the method can include forming at least a second electrode 103 on the bottom surface of the first flexible thin film 104. In some embodiments, forming at least the second electrode 103 can include depositing a second conductive thin film on the bottom surface of the first flexible thin film 104. In addition, forming at least the second electrode 103 can include patterning the second conductive thin film to form the second electrode 103, as illustrated in FIG. 3H. In some embodiments, patterning the second conductive thin film can include applying a photoresist 301c on portions of the second electrode 103 where electrodes are to be formed. In some embodiments, patterning the second conductive film can further include etching the second conductive film, as illustrated in FIG. 3I. For example, etching the second conductive thin film can include dry or wet etching. In FIG. 3J, in some embodiments, patterning the second conductive thin film can further include removing the photoresist 301c.

Figure 3K:
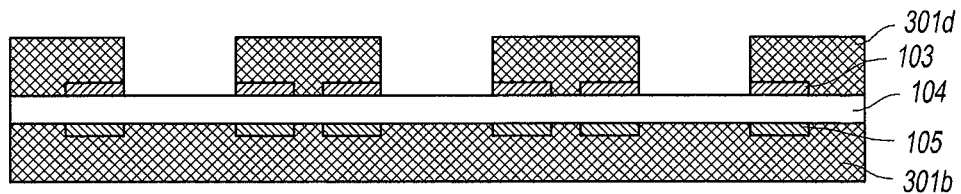
Figure 3L:
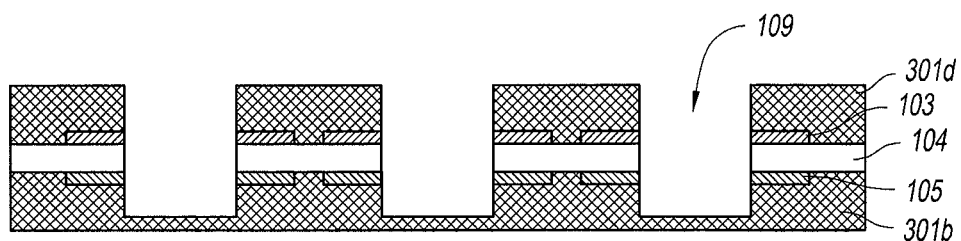
Figure 3M:
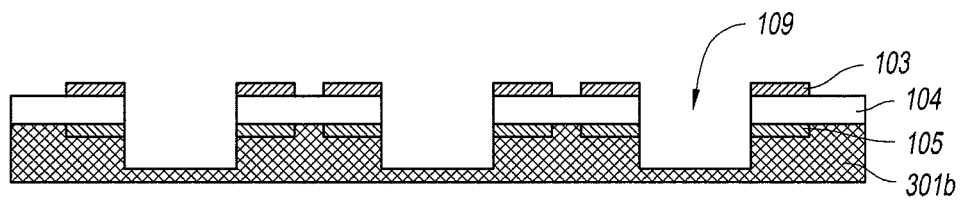

In some embodiments, the method can include forming at least one hole 109 through the first flexible thin film 104. In some embodiments, forming at least one hole 109 can include applying a photoresist 301d over the second electrode 103 and over a portion of the bottom surface of the first flexible thin film 104, as illustrated in FIG. 3K. In some embodiments, forming the at least one hole 109 can include etching the first flexible thin film 104 and a portion of the photoresist 301b, as illustrated in FIG. 3L. In some embodiments, in FIG. 3M, forming the at least one hole 109 can further include removing the photoresist 301d.

Figure 3N:
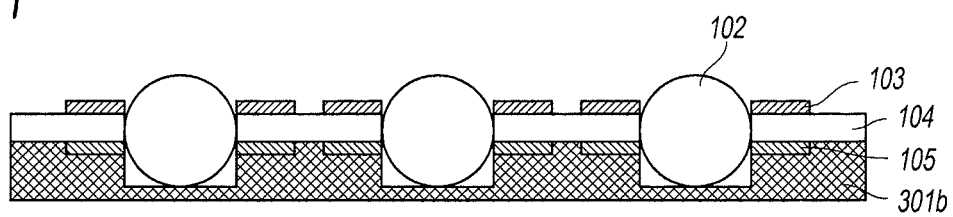

In some embodiments, the method can include providing at least one lens 102 in the at least one hole 109, as illustrated in FIG. 3N. In some embodiments, providing at least one lens 102 can include using squeegee blade printing to provide the at least one lens 102 in the at least one hole 109.

Figure 3O:
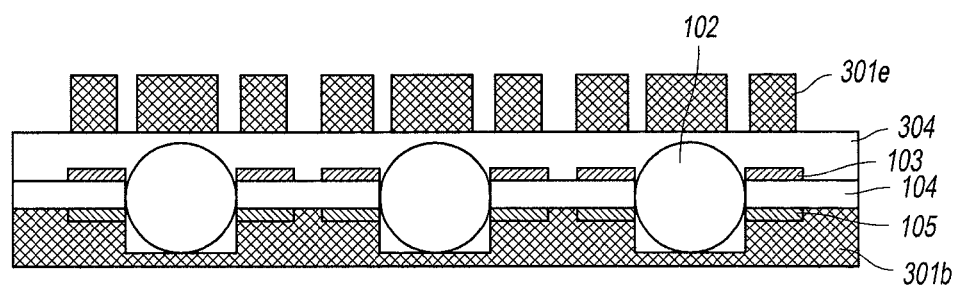
Figure 3P:
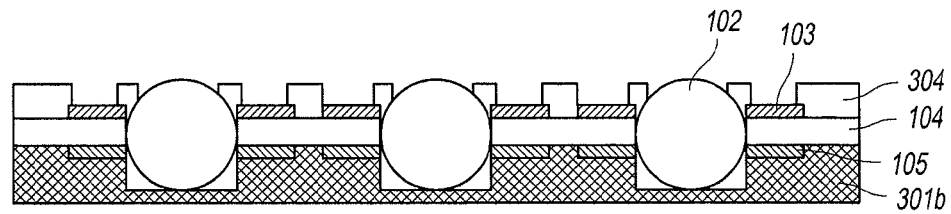
Figure 3Q:
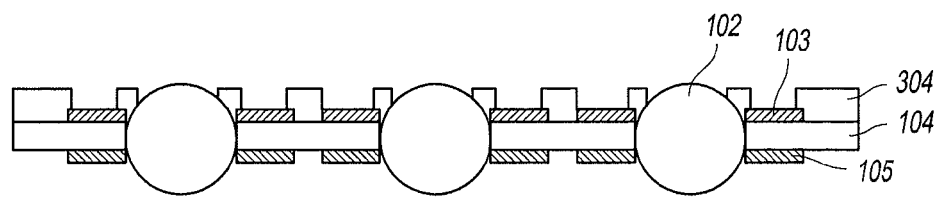

In some embodiments, the method can further include fixing the at least one lens 102 to the first flexible thin film 104. The lens can be fixed in a variety of ways and in some embodiments, need not be fixed by a separate step. In some embodiments, fixing the at least one lens 102 can include depositing a photoplastic organic thin film 304 over the top, bottom, or top and bottom surface of the first flexible thin film 104 and over the at least one lens 102, as illustrated in FIG. 3O. In some embodiments, the photoplastic can be a monomer and/or an oligomer (for example, acrylate epoxy, acrylic urethane, polyester acrylate, etc). Additionally, in some embodiments, fixing the at least one lens 102 can include depositing photoresist 301e over a portion of the photoplastic organic thin film 304. In some embodiments, the method can further include hardening at least a portion of the photoplastic organic thin film 304 (FIG. 3P). In some embodiments, the method can further include dissolving at least a non-hardened portion of the photoplastic organic thin film 304. In some embodiments, the method can further include removing the photoresist 301b from the surface of the first flexible thin film 104 (as shown in FIG. 3Q).

Figure 4:
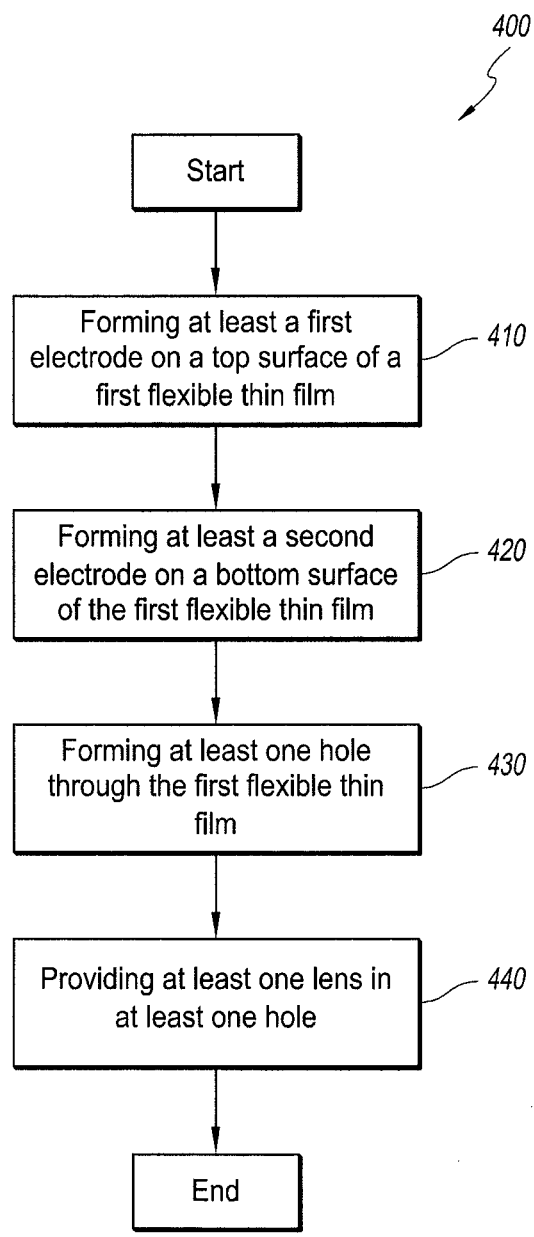
FIG. 4 is a flowchart illustrating some embodiments for preparing a light manipulating device.

FIG. 4 is a flowchart illustrating some embodiments for preparing a light manipulating device. In some embodiments, the process 400 can involve forming at least a first electrode on a top surface of a first flexible thin film (block 410). In some embodiments, the process 400 further involves forming at least a second electrode on a bottom surface of the first flexible thin film (block 420). In some embodiments, the process 400 further involves forming at least one hole through the first flexible thin film (block 430). In some embodiments, the process 400 further involves providing at least one lens in the at least one hole (block 440).

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
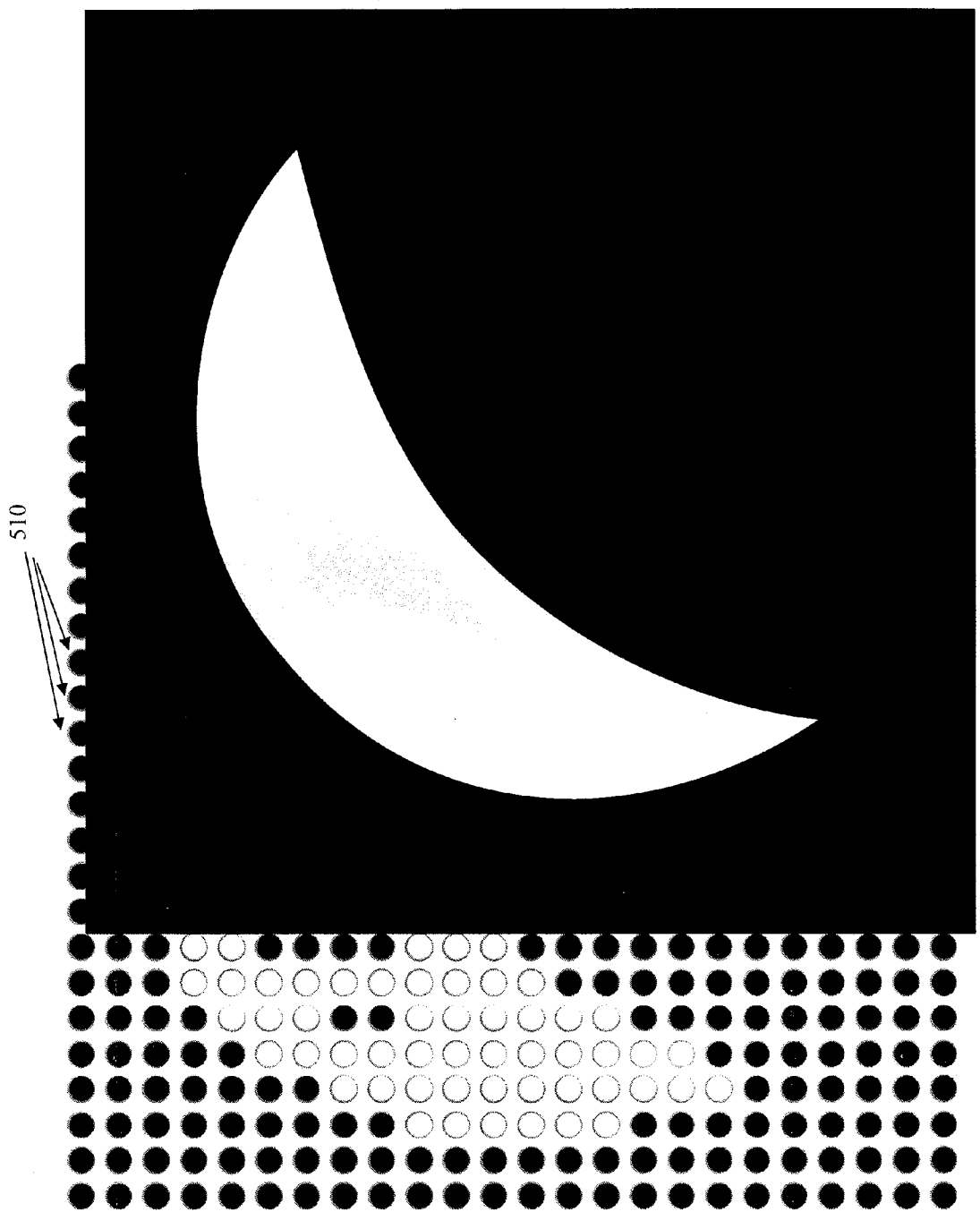
FIG. 5 is a drawing depicting some embodiments of a light manipulating device.

FIG. 5 depicts some embodiments in which a spherical lens array 510 can be used as a backlight unit to produce an image 500. In some embodiments, by emitting light from the lenses in a desired area, it is possible to perform local dimming in a display more effectively. In an area where dark or "black" is to be displayed (or any lower level of light) light emission from the spherical lenses is controlled to be off, whereas in an area that is to be displayed as being "bright" on the screen, light emission is controlled to be on. In embodiments in which a higher resolution or contrast ratio is desired, one can perform local dimming with increased density and resolution by, for example, 1) decreasing the size (diameter of spherical lenses) and/or 2) decreasing the pitch and increasing the number of spherical lenses. Accordingly, it is possible to display images at a higher resolution in some embodiments.

In some embodiments, any light source can be used for supplying light to the light guide. In some embodiments, the light source can be a fluorescent light source (such as a cold cathode fluorescent lamp), a diode, a laser, and incandescent light source, or simply ambient light that has been redirected. In some embodiments, the lights source includes a white LED and/or red, green, and/or blue LEDs.

In some embodiments, the device and/or array includes a single light guide. In some embodiments, the device includes multiple light guides for various sections of the array. In some embodiments, the device includes multiple light guides throughout the entire array. In some embodiments, the light guide is a single plane under the lenses. In some embodiments, the light guide is shaped so as to be under the entire or most of the array. In some embodiments, the light guide has a pattern or design, such that one light source can provide light to the pattern, while another light source can provide light to a differently patterned light guide (which, in some embodiments, can abut the area of the array of the first light guide).

In some embodiments, a lens will only contact a single light guide when actuated. In some embodiments, the lens can contact one or more light guides when actuated, allowing for light in the one or more light guides to be emitted through the lens.

In some embodiments, a single lens is provided. In some embodiments, more than one lens is provided, e.g., 2, 3, 5, 10, 100, 100, 1,000, 10,000, 100,000, 1,000,000, or more lenses (including any range above any of the preceding values and any range between any two of the preceding values). In some embodiments, the preceding values are the density of lenses per square inch. In some embodiments, the maximum number of lenses embedded is (display width)/2r, where 2 is the radius of a lens.

In some embodiments, the lens can be substantially spherical. In some embodiments, the lens can be a different shape. In some embodiments, the top half (above the actuator) and the bottom half (below the actuator) of the lens can be shaped as mirrored images of one another (e.g., each being a semi spherically shape). In other embodiments, the lens can have different shapes on each side. In some embodiments, the lower half can be flattened or squared, so as to allow more surface contact with the light guide. In some embodiments, the bottom half can be more angular, so as to reduce the amount of transmission of light. In some embodiments, the upper half can be flattened or squared, so as to alter the emission of light into a more directed manner. In some embodiments, the upper half can be more angular, so as to direct the emission of light in a different manner.

In some embodiments, rather than repositioning the lenses, a section of the light guide could be deflected upwardly to meet one or more of the lenses As will be appreciated by one of skill in the art, given the present disclosure, the arrays provided herein can be employed for a variety of uses and applications. In some embodiments, the array is arranged as, or part of, a backlighting system. The backlighting arrangement can be for any application for which backlighting is desired. In some embodiments, the array is set up for the backlighting of a liquid crystal display (LCD) or other viewable display, e.g., television, computer monitor, instrument panels, vehicle displays, phones, signs, gaming devices, clocks, tablets, touch screens. Thus, in some embodiments, the array is part of a LCD display or other device to be illuminated and is positioned accordingly. In some embodiments, the array is positioned to provide controllable, but even, illumination over a display or at least a part of a viewable display. In some embodiments, the system of the array and the LCD or other display is set up so that when true blacks are desired on the LCD or display, the lens is not against the light guide, ensuring minimal bleed through of light. In some embodiments, when the LCD (or other) display is to provide a bright (or nonblack) signal, then the lens is positioned against the light guide.

In some embodiments, the density of the lenses is such that it matches the density of the pixels of the device it is illuminating. In some embodiments, the density and/or spacing of the lenses is greater than the pixels of the display to be illuminated so that greater lighting resolution can be provided in comparison to the image display resolution; however, this is not required in various embodiments. In some embodiments, the ratio of lenses to LCD pixels can vary depending upon the desired properties of the device. In some embodiments, the ratio can be from 1000:1, 100:1, 10:1, 1:1, 1:10, 1:100, or 1:1,000, including any range of ratios defined between any two of these ratios, and any range of ratios beneath any one of these ratios.

In some embodiments, the arrays provide light directly to a viewer (rather than to illuminate and LCD or to serve as a backlight). Thus, in some embodiments, each of the lenses can serve as a pixel (or subpixel, e.g., red, green, and blue subpixels positioned next to each other). In some embodiments, the arrays are thus positioned to be directly (or indirectly) viewable by a subject.

In some embodiments, the frequency of actuation of the lenses can be set so as to avoid, or reduce, image flicker. In some embodiments, a vertical scanning frequency of 70 Hz or above can be provided. In some embodiments, the response speed of the actuator can be as high or higher than the refresh rate for the display being illuminated. In some embodiments, the frequency is 70, 100, 1,000, 10,000, 20,000, 30,000, 40,000, 50,000, 60,000 Hz or greater, including any range above any of the preceding values and any range between any two of the preceding values.

In some embodiments, the array and/or system provided herein can be employed as a backlighting system for any desired device or use.

EXAMPLES

Example 1

Method of Making an Array

At least a first electrode on a top surface of a first flexible thin film is formed by depositing a first conductive thin film on the top surface of the first flexible thin film. The first conductive thin film is then patterned to form the first electrode. Patterning the first conductive thin film includes applying a photoresist on portions of the first electrode where electrodes are to be formed. One then etches the first conductive thin film by dry etching. One can then remove the photoresist.

Next, a photoresist is applied to the top surface the first flexible thin film and over the first electrode. One then inverts the entirety of the first flexible thin film, the first electrode, and the photoresist to process the bottom surface of the first flexible thin film.

One then forms at least a second electrode on the bottom surface of the first flexible thin film by depositing a second conductive thin film on the bottom surface of the first flexible thin film and patterning the second conductive thin film to form the second electrode. Patterning includes applying a photoresist on portions of the second electrode where electrodes are to be formed, wet etching the second conductive film, and then removing the photoresist.

One then forms at least one hole through the first flexible thin film and provides a lens into the hole by squeegee blade printing. One then fixes the at least one lens the flexible thin film by depositing a photoplastic organic thin film over the top surface of the first flexible thin film. Any photoplastic organic thin film that blocks the lens itself can then be removed if it interferes with the optical properties of the lens.

Example 2

Method of Manipulating an Array

One first provides a light manipulating device that includes a light guide and an actuator above the light guide. The actuator includes a bottom electrode, a top electrode, and an actuatable layer between the bottom electrode and the top electrode. The light manipulating device includes an array of lenses connected to the actuatable layer. The array of lenses and the light guide have a substantially similar refractive index so as to allow internally reflected light within the light guide to pass through the lens, when the lens is in contact with the light guide. One then contacts one of the lenses to the light guide by bending and/or deflecting the actuator. Light, that is already present in the light guide, passes through the lens and is then emitted out of the lens.

Example 3

Method of Operating an Array as a Backlight

The method of Example 2 is employed with the operation of a LCD device, where the array is positioned to illuminate the LCD surface. An image is generated on the LCD surface that includes light areas and black areas. Sections where there is to be light have a corresponding set of lenses from the array actuated so as to provide additional illumination to the LCD surface in those locations. Sections that are to remain black on the LCD have the corresponding set of lenses from the array unactuated so as to reduce any illumination of the black areas on the display surface of the LCD. As the light and black sections of the LCD display are changed from the image changing on the LCD, the corresponding lenses in the array are updated accordingly, so as to maintain illumination of areas that are to be light on the display and keep unilluminated those sections to remain black. The LCD will have a refresh rate of 60 Hz and the illumination array will have a refresh rate of 1 kHz.

Example 4

Method of Operating an Array as a Display

The method of Example 2 can be used to provide an image from the array. The provided lens array is 1,000 by 1,000 lenses. Each lens is set as a pixel, and is actuated when the pixel is to be illuminated. A signal is sent to the array, actuating a first set of the lenses to provide light to viewer, while leaving a second set of lenses unactuated, thereby providing a contrasting darker section of the array. The difference in illumination between the first set of lenses and the second set of lenses results in an image that can be viewed by the viewer. The image can be refreshed at a rate of 1 kHz.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, compositions or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A light manipulation device, comprising:
   a light guide;
   an actuator above the light guide, the actuator comprising:
      a bottom electrode;
      an actuatable layer; and
      a top electrode above the bottom electrode; and
   at least one lens coupled to the actuatable layer, wherein the at least one lens and the light guide have a substantially similar refractive index;
   wherein the actuatable layer comprises a gel and wherein at least one of the top electrode and the bottom electrode comprise at least one of a carbon nanotube and a conductive polymer.

2. The light manipulation device of claim 1, wherein the at least one lens is approximately spherical.

3. The light manipulation device of claim 1, wherein the actuator is configured to deflect towards the bottom electrode.

4. The light manipulation device of claim 3, wherein the at least one lens is configured to directly contact the light guide if the actuator is deflected towards the bottom electrode.

5. The light manipulation device of claim 1, further comprising a light source configured to emit light to the light guide.

6. The light manipulation device of claim 1, wherein the actuatable layer is positioned between the bottom electrode and the top electrode.

7. A method to operate a light manipulation device, comprising:
providing a light manipulation device according to claim 1;
contacting the at least one lens with the light guide by bending the actuator;
receiving light into the light guide; and
passing the light in the light guide through the at least one lens, when the at least one lens contacts the light guide, thereby operating the light manipulation device.

8. The method of claim 7, further comprising applying a voltage between the bottom electrode and the top electrode.

9. The method of claim 8, further comprising forcing the actuator towards the bottom electrode via the applied voltage.

10. The method of claim 9, wherein the actuator comprises a polymer, and wherein forcing the actuator towards the bottom electrode comprises reducing a thickness of the polymer.

11. The method of claim 7, wherein the at least one lens is spherical, and wherein light entering a bottom point of the spherical lens exits the lens on an opposite side of the lens.

12. The method of claim 7, further comprising removing the at least one lens from contact with the light guide.

13. The method of claim 12, wherein removing the at least one lens is achieved by reversing a voltage between the bottom electrode and the top electrode.

14. The method of claim 12, wherein removing the at least one lens is achieved by removing or reducing a voltage between the bottom electrode and the top electrode.

15. The method of claim 12, further comprising reflecting light internally in the light guide after the at least one lens is released from contacting the light guide.

16. A method to manufacture a light manipulation device according to claim 1, the method comprising:
forming the top electrode by forming at least a first electrode on a top surface of a first flexible thin film;
forming the bottom electrode by forming at least a second electrode on a bottom surface of the first flexible film;
forming at least one hole through the first flexible thin film; and
providing the at least one lens in the at least one hole.

17. The method of claim 16, wherein forming at least the first electrode comprises:
depositing a first conductive thin film on the top surface of the first flexible thin film; and
patterning the first conductive thin film to form the first electrode.

18. The method of claim 17, wherein patterning the first conductive thin film comprises etching the first conductive thin film.

19. The method of claim 16, wherein providing the at least one lens comprises using squeegee blade printing to form the at least one lens in the at least one hole.

20. A light emissive display, comprising:
a light guide;
an actuator above the light guide, the actuator comprising:
a bottom electrode;
a top electrode; and
an actuatable layer between the bottom electrode and the top electrode; and
an array of spherical lenses within the actuatable layer, wherein at least one lens of the array of spherical lenses has a refractive index adequately similar to a refractive index of the light guide so as to allow optical transmission after at least one lens of the array of spherical lenses touches the light guide.

21. The light emissive display of claim 20, wherein the actuatable layer comprises a gel.

* * * * *

UNITED STATES PATENT AND TRADEMARK OFFICE
CERTIFICATE OF CORRECTION

PATENT NO.        : 9,121,985 B2
APPLICATION NO.   : 13/582710
DATED             : September 1, 2015
INVENTOR(S)       : Seike Page 1 of 1

It is certified that error appears in the above-identified patent and that said Letters Patent is hereby corrected as shown below:

In the Specification

In Column 1, Line 8, delete "§371" and insert -- § 371 --, therefor.

In Column 6, Line 1, delete "a is" and insert -- α is --, therefor.

Signed and Sealed this
Twenty-eighth Day of June, 2016

Michelle K. Lee
*Director of the United States Patent and Trademark Office*